Feb. 11, 1964   E. A. KNOWLTON   3,121,129
METHOD OF APPLYING A SEALING MEMBER TO A PREDETERMINED PART
Filed May 8, 1961

Inventor
Edward A. Knowlton,
by Walter S. Jones
Atty.

United States Patent Office 3,121,129
Patented Feb. 11, 1964

3,121,129
METHOD OF APPLYING A SEALING MEMBER TO A PREDETERMINED PART
Edward A. Knowlton, Winchester, Mass., assignor to United-Carr Fastener Corporation, Cambridge, Mass., a corporation of Delaware
Filed May 8, 1961, Ser. No. 108,597
1 Claim. (Cl. 264—45)

This invention aims to provide an improved method of applying sealing material to a fastener member.

An object of the invention is to apply a sealing compound to a fastener member, such as a molding fastener, or any type of fastener preferably having a shank by the use of a molding device having a cavity and a movable plug, preferably made of plastic material such as fluorocarbon or other suitable plastic, and first filling the cavity with a liquid plastisol, partially curing the plastic material, moving the plug from the resulting sealing member, assembling the fastener to the sealing member and finally completing the curing of the sealer and causing it to adhere to the fastener member.

In the drawing, which illustrates a preferred embodiment of the invention:

Heretofore sealed members had been applied to fastener members, such as shown in U.S. patent to Bedford, Jr., No. 2,709,286 issued March 31, 1955, by methods of using preformed sealers in the form of washers or by applying a self-adhering material applied by a nozzle.

Figure 1:
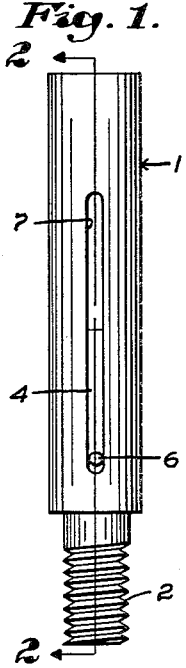
FIG. 1 is a side elevation of a preferred form of molding tool device.
Figure 2:
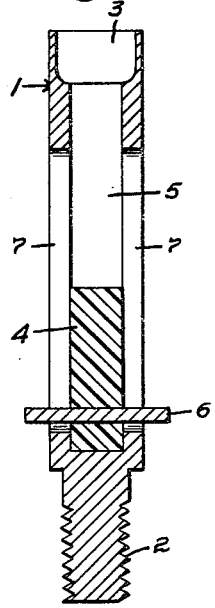
FIG. 2 is a section taken on the line 2—2 of 1.
Figure 3:
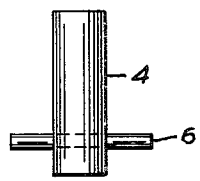
FIG. 3 is a side elevation of the movable plug member of the molding device.
Figure 5:
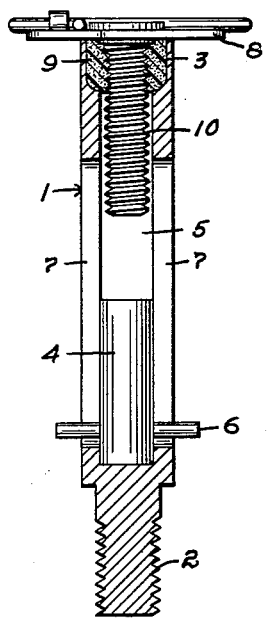
FIG. 5 is a view similar to FIG. 4 with the plug member moved to the "down" position and a molding fastener in place with the plastic sealer attached to the molding fastener.
Figure 6:
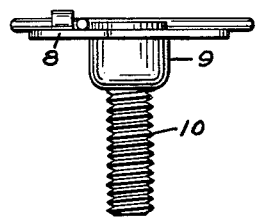
FIG. 6 is a side elevation of a molding fastener with a sealer attached thereto.
Figure 7:
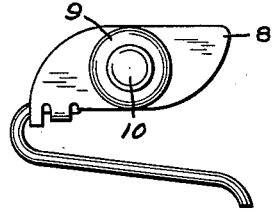
FIG. 7 is a bottom plan view of the device shown in FIG. 6.

The present invention relates to a new method of applying a sealer to a given metal part (one example being shown in FIGS. 5, 6 and 7). To this end there is illustrated a mold device including a mold body 1 having a threaded portion 2 for threading the body 1 to a suitable mold operating device (not a conventional molding machine) not shown. The upper end of the body 1 has a suitably shaped cavity 3 and a movable plug 4 is slidably mounted in a bore 5 in the body 1 as shown by FIGS. 1 and 2. The plug 4 carries a cross pin 6 passing out through grooves 7—7 and beyond the body 1 so that the plug 4 may be moved up and down in the body by suitable external means (not shown) or by hand as desired.

A so-called molding fastener 8 (FIGS. 6 and 7) of well-known construction is illustrated to show how the method of the invention applies a sealer member 9 to the threaded shank 10 of the fastener. A preferred method of forming and applying the sealer 9 to the fastener 8 is by the following steps:

(1) Start with the mold body 1 at room temperature.

Figure 4:
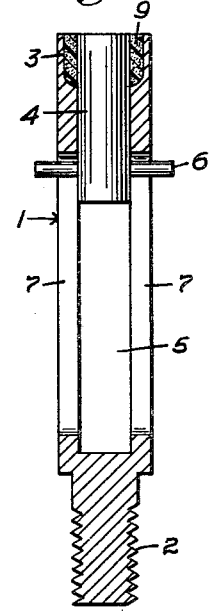
FIG. 4 is a section similar to FIG. 2 with the plug in the "up" or molding position and the cavity filled with plastic material.

(2) Operate the mold so that the plug is in its "up" position, as shown in FIG. 4.

(3) Fill the mold cavity 3, around the plug 4, with a liquid curable plastic material such as so-called plastisol.

(4) Heat the mold body 1 adjacent to the cavity 3 by any suitable temperature control heating means, such as hot air or heat from a resistance coil, (not shown). This causes the plastic material to gel but not to be completely fused or cured.

(5) Cool the mold body 1.

(6) Move the plug 4 to a "down" position so that it is out of the sealing member 9, thereby leaving a central hole in the sealer.

(7) Place the fastener upon the mold body 1 with the threaded shank 10 passing down through the central hole of the sealer 9, as shown in FIG. 5.

(8) Heat the mold body 1 adjacent to the cavity 3 to a temperature hotter than (4) above thereby completing the fusing or cure of the sealer 9 and causing it to expand into the threads of the shank 10 of the fastener 8, thus attaching the sealer tightly to the fastener 9 (FIG. 5), and finally cooling the mold and removing the fastener from the mold body 1.

It should be understood that various constructions of parts may have a sealer member applied by the method of the invention. Also, the shape of the sealer may be varied as desired. Furthermore, it should be understood that the method may be practiced by simple apparatus which may be fully automatic, or by hand operations performed by an operator. In this way, expensive injection molding machines are eliminated and all sorts of shaped sealers applied to all sorts of shaped parts may be accomplished by simple, inexpensive apparatus.

While in most instances applicant's method of applying a sealer to a given part is as described above, however, it should be understood that a primer material first may be applied to a given part so that the sealer more readily adheres to the part.

Applicant has successfully applied so-called foam plastisol material to parts requiring sealers and, in some instances, when desired, the sealers have been made from material in various colors for identification or for decoration.

The plug 4 may be made of any suitable material, but I have found that making it of fluorocarbon prevents sticking to sealer during the molding process.

While there has been illustrated and described a preferred embodiment of the invention, it should be understood that the invention is best defined by the following claim.

I claim:

A method of applying a sealing member to a predetermined part having an externally threaded shank by the use of a simple mold device having a cavity and an associated movable mold plug movable into and out of the mold cavity which comprises filling the mold cavity with liquid plastisol foam with the plug projecting into the mold cavity, heating the foam to a gelatinized consistency, cooling the gelled foam to provide a plastic sealing member, moving the plug from the mold cavity and the gelled sealing member, placing a predetermined part upon the mold, heating the gelled sealing member to a temperature hotter than previously heated thereby causing the sealing member to expand toward said threaded shank, into engagement with said threads and finally cooling the resulting device and removing it from the mold.

References Cited in the file of this patent

UNITED STATES PATENTS

| | | |
|---|---|---|
| 1,979,470 | Johnston | Nov. 6, 1934 |
| 2,368,610 | Fischer | Jan. 30, 1945 |
| 2,409,759 | Hosking | Oct. 22, 1946 |
| 2,880,443 | Febvre | Apr. 7, 1959 |